United States Patent [19]
Badin

[11] 3,717,447
[45] Feb. 20, 1973

[54] FUEL COMPOSITIONS CONTAINING NITROGEN-HETEROCYCLIC SUBSTITUTED CARBAMATES

[75] Inventor: Elmer J. Badin, Hightstown, N.J.

[73] Assignee: Cities Service Oil Company, Tulsa, Okla.

[22] Filed: Feb. 11, 1971

[21] Appl. No.: 114,729

[52] U.S. Cl. ............... 44/63, 252/392, 252/403, 260/309.6
[51] Int. Cl. ........................ C10l 1/18, C10l 1/22
[58] Field of Search ............. 44/63; 252/392, 403; 260/309.6

[56] References Cited

UNITED STATES PATENTS 2,839,371  6/1958  Sigworth et al............................44/63
2,991,162  7/1961  Malec.........................................44/72

Primary Examiner—Daniel E. Wyman
Assistant Examiner—W. J. Shine
Attorney—Richard Geaman

[57] ABSTRACT

Compounds useful as additives in hydrocarbon fuels are prepared by reacting urea with a nitrogen-heterocyclic substituted alcohol, for example an organylimidazolinyl substituted alcohol, in the presence of an organic solvent. The reaction products are carbamates containing, for example, organylimidazolinyl substituents. Hydrocarbon fuel compositions containing these additives exhibit enhanced carburetor detergency and have other beneficial multifunctional properties of value to combustion improvement.

8 Claims, No Drawings

FUEL COMPOSITIONS CONTAINING NITROGEN-HETEROCYCLIC SUBSTITUTED CARBAMATES

BACKGROUND OF THE INVENTION

The present invention relates to a hydrocarbon fuel composition additive for increased carburetor detergency and other beneficial multifunctional properties of value to combustion improvement. More particularly, the present invention discloses a new composition of matter, nitrogen-heterocyclic substituted carbamates, and the uses thereof.

Normally, liquid hydrocarbon products, such as fuels, often require additives to improve their performance characteristics. Thus, in fuels such as gasoline, diesel fuel, and jet fuel, various additives are employed which assist in increasing detergency and dispersancy in the carburetor and fuel intake. The additives vary in effectiveness and it is often necessary to use a number of additives in a single composition. Furthermore, many additives for hydrocarbon fuels are employed in concentrations that approach the limits of solubility. As a result, hydrocarbon fuel compositions containing such additives often exhibit poor stability and form gums on standing.

It is an object of this invention to provide additives which, when incorporated in normally liquid hydrocarbon fuels, impart desirable properties thereto.

It is another object of this invention to provide additives which, when incorporated in normally liquid hydrocarbon fuels, produce stable compositions.

It is still a further object of this invention to provide normally liquid hydrocarbon fuel compositions having enhanced carburetor fuel intake system detergency properties and other properties of value to combustion improvement.

With the following objects in mind, the present invention may be more fully understood with reference to the following description and disclosure.

SUMMARY OF THE INVENTION

The objects of the present invention are accomplished through a composition of matter comprising the product of reacting urea with a nitrogen-heterocyclic substituted alcohol, for example an imidazolinyl group attached via hydrocarbylene to the 1-position of an imidazoline ring which may be substituted at the 2-, 4-, or 5- positions. An example of the new composition of matter has the formula

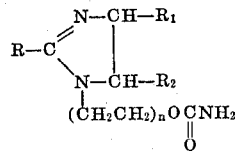

wherein $n$ is an integer having a value from 2 to 8, and is preferably 2 to 4; R, $R_1$ and $R_2$ may be hydrogen, hydrocarbyl, or organyl; if R, $R_1$, or $R_2$ are hydrocarbyl or organyl, they may have from eight to 36 carbons and be alkyl, alkenyl, aryl, aralkyl, alkaryl, naphthenic, polyalkyleneoxy terminated by alkoxy, and the like; and R, $R_1$, or $R_2$ may contain other non-metal elements, but excluding amino nitrogen as it reacts with urea.

Normally, liquid hydrocarbon fuel compositions may be formed comprising a major proportion of a normally liquid hydrocarbon fuel and a minor portion of one or more of the above identified compounds. These fuels have the particular advantage in that they exhibit desirable properties, greatly improve the carburetor detergency characteristics, and have other beneficial properties of value to combustion improvement. In addition, liquid hydrocarbon fuel compositions containing the additive compounds of this invention are stable with little tendency toward gum formation.

DETAILED DESCRIPTION OF THE INVENTION

The novel compositions of the present invention are prepared by the reaction of urea with a nitrogen-heterocyclic substituted alcohol, for example in the presence of a hydrocarbon solvent. The reaction may be considered to proceed by the equation, e.g.

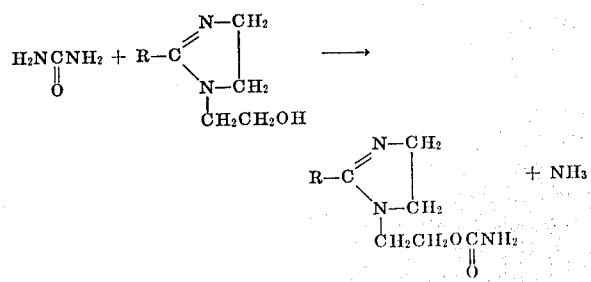

wherein R is as defined under the preceding heading, $R_1$ and $R_2$ are hydrogen, and $n$ is 2.

A significant finding of the present invention is that the compositions of matter described herein are formed without undesired side reactions which greatly decrease the yield by causing insoluble, partially sublimed, solid by-products. This is in contradistinction to the known reaction of urea with an alcohol having no organylimidazolinyl substituent, which reaction results in formation of undesired by-products and greatly decreased yield. The reason for side reactions is that the first step in the mechanism is accepted as decomposition of urea to isocyanic acid (HN=C=O) and $NH_3$; followed by the second step of addition of alcoholic OH to isocyanic acid to yield carbamate. Isocyanic acid is so reactive that it is a stable monomer only below 0° C and above this temperature it can form insoluble, solid, undesirable, white by-products via: trimerization to cyanuric acid,

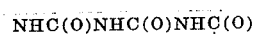

polymerization to cyamelide, [—NHC(O)—]$_n$ reaction with urea to form biuret, $H_2NC(O)NHC(O)NH_2$. Absence of such side reactions during formation of compositions of matter of the present invention is apparently due to the basic nature of one of the heterocyclic nitrogens in the organylimidazolinyl alcohol reactant. An intramolecular mechanism, whose exact nature is not known, apparently causes this. There might be transient coordination of the intermediate HN=C=O with the basic nitrogen of the reactant, restricting freedom of HN=C=O to form by-products, followed by HN=C=O undergoing intramolecular shift to the alcohol group where it undergoes the expected reaction.

Other compositions of matter similar to the preceding structure, but with a different heterocyclic ring in place of the imidazoline ring, are part of the present invention. New carbamates are formed by reaction of equimolar quantities of urea and an alcohol which may be, for example, any one of 1-hydroxyethyl-3-heptadecenyl-pyrazole
2-hydroxypropyl-5-octadecyl-pyrimidine
1-hydroxyethyl-5-oleyl-indole
1-hydroxyhexyl-4-octadecyl-piperidine
2-hydroxyethyl-6-oleyl-isoindole
1-hydroxypropyl-3,4-(di-2-ethylhexyl)-pyrrolidine
4-hydroxyethyl-2-heptadecenyl-morpholine
5-hydroxyoctyl-2-heptadecyl-oxazoline
1-hydroxyethyl-4-oleyl-2-pyrroline
1-hydroxybutyl-4-octadecyl-piperazine
1-hydroxyethyl-3,4-(diisooctyl)-pyrrole
3-hydroxyethyl-4-heptadecenyl-furazan The products so prepared and described herein contained some impurities, due partially to use of commercially available alcohols containing impurities and partially to presence of unreacted alcohol in the product. Tests were carried out on the product mixtures so formed.

Preparation of the novel composition of the present invention is illustrated through the following examples.

EXAMPLE 1

A preparation of 2-heptadecenyl-2-imidazolin-1-yl-ethyl carbamate was carried out. The solvent and reactants were 300 milliliter of reagent grade toluene solvent, 175 gram or about 0.50 mole of 1-hydroxyethyl-2-heptadecenyl-2-imidazoline of 92 percent purity, and 27.6 gram or 0.46 mole of urea. The motor-stirred reaction mixture at room temperature was a dispersion of solid urea in liquid. After heating the stirred mixture to reflux, vigorous ammonia evolution, as evidenced by water-moistened indicator paper and characteristic odor, occurred at 121° C pot temperature. Reflux of the stirred reaction mixture was carried out for a total of 9.75 hour, at which time ammonia evolution had stopped while the pot temperature was still 121° C. Observations throughout the preparation showed there was no evidence of sublimed or insoluble, white by-product formation. Solvent was removed from the clear liquid product by distillation in vacuo at 50° C maximum pot temperature at 22 mm Hg. The residual product was a clear tan liquid weighing 199.0 gram after drying to constant weight in a vacuum oven at ambient temperature.

Nitrogen analysis of the product: calculated 9.84 weight percent for the carbamate from 92 weight percent purity alcohol, found 10.0 weight percent average by Kjeldahl method, indicating essentially quantitative conversion to carbamate. The infrared spectrum of the product, with attention given to the particular absorptions associated with the carbamate group, showed: strong absorption in the region of 3300 cm$^{-1}$ assigned to N-H stretching; broad absorption in the 1600–1750 cm$^{-1}$ range, containing a band in the region of 1720 cm$^{-1}$ assigned to C=O stretching; absorption near 1090 cm$^{-1}$, tentatively assigned to C—O—C=O which is known to absorb in this region; two weak absorptions near 2150 cm$^{-1}$ and 2250 cm$^{-1}$, possibly due to N=C—O which might be the result of an impurity formed as a salt from HN=C=O and the basic nitrogen of the imidazolinyl substituent Infrared spectrum of a distilled portion of the product, the main fraction of 90 weight percent found to distill in the region of 290° C at about 13 mm Hg, showed absorptions similar to those of the undistilled product except for absence of the impurity absorptions near 2150 cm$^{-1}$ and 2250 cm$^{-1}$.

The product as originally obtained was readily soluble at room temperature to at least 10,000 ppm in either gasoline, diesel fuel, or a lube stock consisting of 10 volume percent bright stock and 90 volume percent 650 neutral oil.

EXAMPLE 2

Preparation of 2-heptadecenyl-2-imidazolin-1-yl-ethyl carbamate was made using smaller quantities of reactants and higher reaction temperature than in Example 1. Reactants and solvent used were: 5.5 gram urea (0.092 mole), 35.0 gram 1-hydroxyethyl-2-heptadecenyl-2-imidazoline (about 0.10 mole) of 92 weight percent purity, and 200 milliliter of reagent grade xylenes solvent. The motor-stirred reaction mixture was refluxed for a total of 6.3 hour with maximum pot temperature of 138° C, during the last hour of which a slow stream of nitrogen was passed through the reaction mixture. No formation of sublimed or insoluble by-product occurred during preparation. Other observations made throughout the reaction were similar to those described for the procedure in Example 1. After completion of the reaction, solvent was removed from the clear reaction mixture by distillation in vacuo to 95° C maximum pot temperature at 20 mm Hg. The residual material remaining was a tan, viscous liquid weighing 36.1 gram. This material on standing was observed to precipitate a very small quantity of brown precipitate. The product, used for analysis and tests with fuel compositions, was the upper tan viscous liquid and did not include the brown deposit. Nitrogen analysis of this product indicated that it contained 85 weight percent of the carbamate with the remainder being unreacted alcohol, and suggested that the discarded brown deposit was an allophanate formed from reaction of 2 mole urea with 1 mole alcohol. Infrared spectrum of the product showed absorptions similar to those of the product described by Example 1. The solubility of the product was at least 10,000 ppm in either gasoline or diesel fuel.

EXAMPLE 3

Preparation was carried out of a carbamate from reaction of urea with 9-octadecen-1-ol, an alcohol having no imidazolinyl substituent, under conditions similar to those used in Example 2 with objective of determining whether there was decreased yield and formation of by-products due to absence of the imidazolinyl substituent.

Two hundred milliliter of xylene solvent of reagent grade were utilized as solvent for the reaction of 26.9 gram or 0.10 mole of 9-octadecen-1-ol with 6.0 gram or 0.10 mole of urea. The motor-stirred reaction mixture was refluxed at 143°C maximum pot temperature for approximately 8 hour. A white solid by-product was observed to sublime into the condensor after heating for 0.5 hour. The solid continued to be sublimed throughout reflux, and an appreciable amount of white solid by-product was present in the condenser at the end of the experiment. After 8 hour reflux when ammonia evolution had ceased, the solvent was removed by distillation in vacuo at 60° C maximum pot temperature and 16 mm Hg. The residual material was an opaque yellow-white paste weighing 25.3 gram. Microscopic examination at 60X of this material, as a thin layer between glass slides, showed the presence of some solid particles in a liquid phase. The material on standing precipitated a small lower layer of solid material. The product, utilized for analysis and tests in fuel, was the upper viscous liquid layer separated from the small quantity of solid precipitate.

Nitrogen analysis of this product: 4.50 weight percent N calculated for 9-octadecenyl-1-carbamate; 1.77 weight percent N found by the Kjeldahl method for the 25.3 gram product, indicating only about 40 weight percent of the product was the expected carbamate and the remainder was unreacted 9-octadecen-1-ol. Infrared spectrum of this product showed absorptions characteristic of free OH groups, supplying further indication of its being a mixture of unreacted 9-octadecen-1-ol and the expected carbamate.

EXAMPLE 4

The normal liquid hydrocarbon fuel compositions of the present invention are prepared by incorporating into a measured proportion of a normally liquid hydrocarbon fuel a moderate proportion of an additive which is the novel composition of the carbamate compound of the present invention. Examples of normal liquid hydrocarbon fuels that have desirable properties imparted thereto by the additives of this invention are gasoline, diesel fuel, and jet fuel. To show the surfactancy of these properties of the composition of the present invention, the interfacial tension (IFT) of gasoline containing the products of this invention at 50 ppm (13 PTB) was determined to supply indications of the surfactant properties of the compositions as disclosed by the effect of the products upon the lowering of the interfacial tension. In particular, the effect of the products on interfacial tension of a gasoline containing three ml of tetraethyl lead per gallon was determined by using the standard interfacial tension technique described in ASTM D-971. Table 1 illustrates the results of these tests for the product prepared as described by Example 2 and for the product not containing the hydrocarbylimidazolinyl substituent from Example 3.

TABLE 1

| Additive (50 ppm in base fuel) | IFT, dyne/cm at 25°C | % Reduction in IFT |
| --- | --- | --- |
| Example 2 | 11.6, 9.7, avg 10.7 | 62, 69, avg 65 |
| Example 3 | 30.7 | 0.3 |
| Base fuel | 30.8 | - |

The effective surfactancy or lowering of interfacial tension by the added composition is shown by Table 1. By percent reduction in interfacial surface tension is meant the difference between the base fuel interfacial tension and the interfacial tension of the sample divided by the interfacial tension of the base fuel, the whole multiplied by 100 to put the reduction on a percentage basis.

EXAMPLE 5

To determine whether the new composition of matter of the present invention have either a beneficial or adverse effect on fuel stability, 50 parts per million of each of the products in Example 2 and 3 were introduced into a base fuel of gasoline containing 3 milliliter of tetraethyl lead per gallon. The induction period test for these fuel compositions was measured by the procedure in ASTM D-525; and existent gum and potential gum tests are from the standard procedures ASTM D-381 and ASTM D-873, respectively. Table 2 describes the results so obtained.

TABLE 2

| Additive (50 ppm in Base fuel) | Induction Period(D-525), min | Gum Existent (D-381) | Gum Potential (D-873), 4 hr |
| --- | --- | --- | --- |
| Example 2 | 765 | 12.8/0.8 | 12.6/5.4 |
| Example 3 | 720 | 12.0/2.0 | 12.0/2.8 |
| Base fuel | 690 | 11.0/1.4 | 16.0/3.4 |

These results show that the products from Examples 2 and 3, as compared with base fuel along, do not adversely affect the properties shown within the limits of repeatability of the tests.

The anti-rust properties of the same fuel compositions described in Table 2 were observed using the procedure of ASTM D-665-A, modified to 100°C at 24 hr. Further modification was used by expressing the results on a scale of 1.0 for visual observation of rusting caused by base fuel alone, a number less than 1.0 indicating better anti-rust properties. Results obtained were: 0.12, repeated as 0.15, for the additive as product from Example 2; 0.62 for additive as product from Example 3; 1.0 for base fuel alone. It is evident that the product from Example 2 greatly improves anti-rust properties of the base fuel although not supplying complete protection from rusting.

EXAMPLE 6

Further testing was made to determine the effects of products of this invention on carburetor detergency of base fuel of gasoline containing 3 ml tetraethyllead per gallon. The carburetor detergency tests were carried out by a technique described by R. G. Smith, Jr. and R. P. Doelling (Society of Automotive Engineers, Paper 700669, Los Angeles, California, Aug. 24–27, 1970) with the modification that the reference was base fuel of gasoline containing 3 ml tetraethyllead per gallon without any detergency additive. These data are summarized in Table 3 in which automotive laboratory carburetor detergency tests were performed utilizing 50 parts per million of the carbamate product from Example 2 and the carbamate product of Example 3, each compared with the carburetor detergency of the base fuel containing no detergency additive.

TABLE 3

| Additive (50 ppm in base fuel) | Carburetor Detergency Reflectance Units | % Effectiveness |
| --- | --- | --- |
| Example 2 | 16.8 | 305% |
| Example 3 | 5.25 | 91% |
| Base Fuel (reference) | 10.25 | 100% |

Percent effectiveness is defined as the quantity, additive reflectance units over the reference reflectance units, times 100. The product from Example 2 was determined to be about 3 times as effective as the base fuel, whereas the product from Example 3 caused no improvement.

Normal liquid hydrocarbon fuel compositions containing the additives of this invention will vary in composition, depending on the fuel properties that are desired to impart thereto. Generally, gasoline, diesel fuel, and jet fuel compositions containing about 1 to about 50, and preferably about 3 to about 15, pounds per thousand barrels (PTB) of the additives of this invention are utilized. If necessary, the solubility of the additive in the hydrocarbon fuel may be increased by first dissolving the additive in a polar solvent which is miscible with the hydrocarbon fuel. An example of a suitable solvent for this purpose is a 50/50 mixture of toluene and 1- methoxy-2-propanol. If desired, the fuel compositions may also contain conventional additives such as antioxidants, octane improvers, and metal scavengers.

It is contemplated that the additives for this invention may be employed in gasoline compositions which may or may not contain lead alkyls and can supply combustion improvement to decrease undesirable engine exhaust emissions.

Through the utilization of the novel composition of matter of the present invention for use as an additive, in hydrocarbon fuels, a carburetor detergency effect is afforded to give carburetor cleanliness. The additives may be used with lead based gasolines, gasolines containing no lead, or with the gasolines which contain other additives. The additive is stable within the fuel and has the added characteristic of lowering interfacial tension of the fuel.

The present invention has been described above with particular respect to embodiments thereof. It will be understood, however, by those skilled in the art, that various changes and modifications may be made without departing from the spirit and scope of the invention.

Therefore, I claim:

1. A normally liquid hydrocarbon fuel composition comprising a major proportion of a normally liquid hydrocarbon fuel and a fuel improving proportion of an additive which is a nitrogen-heterocyclic substituted carbamate.

2. The normally liquid hydrocarbon fuel composition of claim 1 wherein said nitrogen-heterocyclic substituted carbamate in addition contains an oxygen atom in the heterocyclic ring.

3. The normally liquid hydrocarbon fuel composition of claim 2, in which the additive has a heterocyclic group selected from the group consisting of pyrazole, pyrimidine, indole, piperidine, isoindole, pyrrolidine, morpholine, oxazoline, pyrroline, piperazine, pyrrole, furazan, and imidazoline radicals.

4. The normally liquid hydrocarbon fuel composition of claim 3 in which the additive is represented by the formula

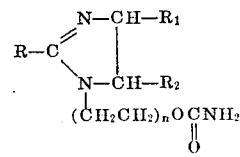

wherein $n$ is an integer having a value from 2 to 8; R, $R_1$ and $R_2$ are selected from the group consisting of hydrogen, polyalkeneoxy terminated by alkoxy and hydrocarbyl group selected from the group consisting of alkyl, alkenyl, aryl, aralkyl, alkaryl and naphthenic.

5. The normally liquid hydrocarbon fuel composition of claim 4 in which the additive is represented by the formula

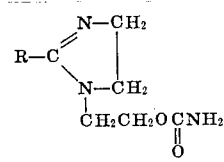

wherein R is selected from the group consisting of hydrogen, polyalkenyloxy terminated by alkoxy and hydrocarbyl group selected from the group consisting of alkyl, alkenyl, aryl, aralkyl, alkaryl and naphthenic.

6. The composition of claim 5 wherein the normally liquid hydrocarbon fuel is selected from the group consisting of gasoline, diesel fuel, and jet fuel.

7. The composition of claim 6 in which the concentration of the additive is about 1 to about 15 pounds per thousand barrels of said composition.

8. The composition of claim 7 in which R is a heptadecenyl group.

* * * * *